United States Patent [19]

Raphael et al.

[11] Patent Number: 4,653,775

[45] Date of Patent: Mar. 31, 1987

[54] PREPRINTED IMAGE-RECEIVING ELEMENTS FOR LAMINATED DOCUMENTS

[75] Inventors: Thomas Raphael, Winchester; Joseph Shulman, Chestnut Hill, both of Mass.

[73] Assignee: Polaroid Corporation, Patent Dept., Cambridge, Mass.

[21] Appl. No.: 789,553

[22] Filed: Oct. 21, 1985

[51] Int. Cl.[4] .......... B42D 15/00; G09C 1/00; G03C 5/54; G03C 7/00

[52] U.S. Cl. .......... 283/108; 283/74; 430/213; 430/215

[58] Field of Search .......... 283/108, 74; 430/10, 430/212, 213, 215, 238, 237, 216, 941; 40/2.2; 428/189

[56] References Cited

U.S. PATENT DOCUMENTS

| | | | |
|---|---|---|---|
| 3,148,061 | 9/1964 | Haas | 430/213 |
| 3,279,826 | 10/1966 | Rudershausen | 283/7 |
| 3,362,819 | 1/1968 | Land | 430/213 |
| 3,417,497 | 12/1968 | Hannon | 40/2.2 |
| 3,471,172 | 10/1969 | Bayha | 283/74 |
| 3,582,439 | 6/1971 | Thomas | 161/5 |
| 3,614,839 | 10/1971 | Thomas | 40/2.2 |
| 3,758,970 | 9/1973 | Annenberg | 40/2.2 |
| 3,770,439 | 11/1973 | Taylor | 430/213 |
| 4,009,030 | 2/1977 | Abel | 430/215 |
| 4,097,279 | 6/1978 | Whitehead | 96/27 |
| 4,101,701 | 7/1978 | Gordon | 428/189 |
| 4,115,618 | 9/1978 | MacLeish | 430/213 |
| 4,232,079 | 11/1980 | Raphael et al. | 428/195 |
| 4,322,489 | 3/1982 | Land et al. | 430/213 |
| 4,359,517 | 11/1982 | Bourgeois | 430/213 |
| 4,499,174 | 2/1985 | Bishop et al. | 430/212 |
| 4,506,915 | 3/1985 | Haghiri-Tehrani et al. | 283/108 |

FOREIGN PATENT DOCUMENTS 1427581 3/1973 United Kingdom .

*Primary Examiner*—Paul A. Bell
*Assistant Examiner*—Paul M. Heyrana, Sr.
*Attorney, Agent, or Firm*—Louis G. Xiarhos

[57] ABSTRACT

An image-receiving element adapted to the provision of a diffusion transfer photograph and having a preprinted security pattern between contiguous layers thereof is disclosed. The pattern comprises a patterning agent and a binder therefor preferentially adhesive to the contiguous layer closest in proximity to the image-receiving layer of such element. Diffusion transfer photographs prepared from the image-receiving element carrying the preprinted security pattern are useful in the production of an information-bearing document such as an ID card.

25 Claims, 6 Drawing Figures

PREPRINTED IMAGE-RECEIVING ELEMENTS FOR LAMINATED DOCUMENTS

BACKGROUND OF THE INVENTION

This invention relates to image-receiving elements for use in diffusion transfer photographic processes and in the production of laminated information-bearing documents such as identification (ID) cards. More particularly, it relates to such image-receiving elements including a predetermined preprinted security pattern and to the securement of laminated documents prepared therefrom.

Laminated docments (such as ID cards) essentially comprise a card or other document usually containing information relating to the bearer, and frequently will include a portion of the information in the form of a photograph of the bearer. Normally, the card or other document will be protected by a plastic sheet material such as by lamination of a protective plastic sheet material to the document, or, as is more usually the case, by lamination of the document between a pair of plastic sheets. Laminated documents such as ID cards have many recognized applications. For example, they are used to establish a person's authorization to conduct certain activities (e.g., driver's licenses) or their right of access to certain areas (e.g., employee passes) or their authorization to engage in credit or other business transactions (e.g., credit cards). In view of the widespread use of laminated documents, especially in commercial transactions, such as cashing checks, credit purchases and the like, it is important that persons relying on such documents as a means of verifying the identity of the bearer have maximum assurance that the ID card or other document has not been altered and that the document is not a counterfeit.

Considerable effort and ingenuity has been employed in the art of security documents to provide the desired degree of assurance. For example, specialized adhesive systems and lamination techniques have been developed to prevent or discourage alteration of ID cards. These systems and techniques are designed to acheive a high degree of bonding efficiency between a surface of the card and a plastic sheet bonded thereto. Certain adhesive systems, for example, can provide what is known in the art as a "security seal", which is best understood by reference to what occurs if an attempt is made to remove the protective plastic sheet material from the surface of the card. If a "security seal" exists, all or at least portions of the adhered surface will be removed from the card together with the plastic sheet. Under such circumstances, removal of portions of the information-bearing surface of the card evidences the attempted removal of the protective sheet; and destruction or disfiguring of the information-bearing surface renders the card unuseable for alteration purposes. Adhesives and methods for providing "security seals" in ID cards are described, for example, in U.S. Pat. No. 3,582,439 (issued June 1, 1971 to J. F. Thomas); U.S. Pat. No. 3,614,839 (issued Oct. 26, 1971 to J. F. Thomas); U.S. Pat. No. 4,101,701 (issued July 18, 1978 to M. E. Gordon); and U.S. Pat. No. 4,115,618 (issued Sept. 19, 1978 to W. T. MacLeish et al.)

Various other features have been embodied into ID cards as means for rendering the card tamper-proof or for verifying authorized issuance or authenticity of the card. The best known verification feature takes the form of the signature of the bearer of the card or of the issuing authority. Others include fluorescent materials, printed patterns, indicia and designs, and printed guilloche patterns customarily used on securities and banknotes, such as described in U.S. Pat. No. 3,279,826 (issued Oct. 18, 1966 to F. J. Rudershausen et al.); U.S. Pat. No. 3,417,497 (issued Dec. 24, 1968 to D. F. Hannon); U.S. Pat. No. 3,758,970 (issued Sept. 18, 1983 to M. Annenberg); U.S. Pat. No. 4,097,279 (issued June 27, 1978 to E. N. Whitehead); U.S. Pat. No. 4,232,079 (issued Nov. 4, 1980 to T. Raphael, et al.); and British Patent Specification No. 1427581 (published Mar. 10, 1976).

Commercial "instant" or "on-the-spot" ID card issuance systems have been employed to provide an ID card for an intended bearer for immediate use. Many such systems are based on cards or documents comprising color photographs from diffusion transfer photographic film units. Diffusion transfer photographic film units useful for this purposes are commercially available from Polaroid Corporation under the trademark designation Polacolor 2. Essentially, such film units comprise a photosensitive element that can provide an imagewise distribution of diffusible image-dye providing materials, after exposure and after application of a processing composition between the photoexposed element and a superposed image-receiving element. Once development is complete, the photosensitive and image-receiving elements are peeled apart and the image is viewed in the image-receiving layer of the image-receiving element. Typically, the diffusion transfer print will be a diffusion transfer processed recordation of the likeness of the intended bearer and certain personal information relating to the bearer and will be the result of simultaneously photographing the bearer and a data card containing such personal information. The print will then be protected by lamination of a plastic sheet over the diffusion transfer photographic print or, as discussed above, by laminating the photograph between a pouch comprising front and back protective sheets.

The integration into a laminated document of a feature designed to enhance the security of the document against alteration and/or couterfeiting can be accomplished in number of ways. For example, a verification pattern in pigment material can be integrated into the adhesive bond existing between the photograph and the protective plastic sheet, as described in the aforementioned U.S. Pat. No. 4,232,079. Incorporation of indicia or other features into a diffusion transfer image-receiving element may, however, present difficulties from the standpoint of production of such an element or the security of a laminated document prepared therefrom. Typically, the image-receiving element employed in a diffusion transfer film unit useful for the production of color ID photographs will comprise a support carrying a polymeric acid layer, a time modulating (or spacer) layer and an image-receiving layer. The incorporation into such an image-receiving element of, for example, a pattern of fine-line security printing, such as is commonly used in banknote paper, stock certificates and the like, and which by the intricate nature of the pattern discourages reproduction and serves as a security feature for documents, may present certain difficulties. The presence of a printed pattern, for example, may prevent adequate adhesion between the layers of the image-receiving element and may contribute to undesired delamination upon attempts to remove the document from the laminate.

In the case of an image-receiving element comprised, for example, of a support carrying, in order, a polymeric acid layer, a time modulating layer and an image-receiving layer, it may be desirable from the standpoint of security to incorporate a fine-line security pattern by printing the desired pattern onto the time modulating layer (prior to application of the superposed image-receiving layer). Upon production of a diffusion transfer photograph from such element, the informational content of the image-bearing layer may then be viewed along with the preprinted fine-line security pattern, which typically will be a unique and self-identifiable pattern preselected by the issuing authority. The resulting ID photograph, as mentioned previously, may be secured by laminating the photograph between a pouch of front and rear polymeric sheet members.

It will be appreciated that it would be extremely disadvantageous if one could alter such a document without evidence of tampering or if the components of the document could be delaminated or parts thereof be reused for the fabrication of an altered or counterfeit document. For example, it would be undesirable if a delamination were to occur in such a manner that the protective cover sheet and image-bearing layer could be separated from the document leaving an element comprised of the support carrying the polymeric acid layer, the time-modulating layers and the unique printed pattern intact thereon. This would be unacceptable for the reason that the remaining element carrying the unique printed pattern could be re-used for the fabrication of another laminated document having the appearance of a validly issued document. Such an occurrence would thwart to a considerable degree the security afforded by the fine-line printed pattern.

SUMMARY OF THE INVENTION

It has been found that a laminated information-bearing document based upon a diffusion transfer photograph can be considerably improved in security by incorporating between contiguous layers of the image-receiving element used in the production of such a photograph, a printed security pattern comprising ink and a binder therefor, the binder being preferentially adhesive to the layer of such contiguous layers closest in proximity to the image-receiving layer. In this way, and in the event that a delamination at the interface of such contiguous layers can be effected, the printed security pattern accompanies the image-bearing layer in preference to the other of said contiguous layers. According to a product aspect of the present invention, there is, thus, provided an image-receiving element for production of a diffusion transfer photograph therefrom, said image-receiving element comprising a support layer carrying, in sequence, a polymeric acid layer, a polymeric timing layer, and an image-receiving layer, said image-receiving element including between contiguous layers thereof, a printed security pattern comprising a patterning agent and a binder therefor preferentially adhesive to the layer of such contiguous layers closest in proximity to said image-receiving layer.

According to another of its product aspects, the present invention provides a laminated information-bearing document comprising an information-bearing diffusion transfer print and a protective plastic sheet material bonded to at least a surface thereof, said information-bearing diffusion transfer print comprising a support layer carrying, in sequence, a polymeric acid layer, a polymeric timing layer, and an image-bearing layer, said information-bearing diffusion transfer print including between contiguous layers thereof, a printed security pattern comprising a patterning agent and a binder therefor preferentially adhesive to the layer of such contiguous layers closest in proximity to said image-bearing layer.

DETAILED DESCRIPTION OF THE INVENTION

As mentioned, the present invention involves the integration of a printed security pattern into an image-receiving element used for the production of an information-bearing diffusion transfer print and the production of laminated documents therefrom. Incorporation of a predetermined printed pattern, such as a fine-line intricate pattern, into the layers of an image-receiving element provides considerable security for laminated documents against alteration and counterfeiting. The manner in which the printed pattern is embodied in the articles of the invention and the relation of the components thereof to the attainment of security in laminated information-bearing documents will be better understood by reference to the description that follows.

Figure 1:
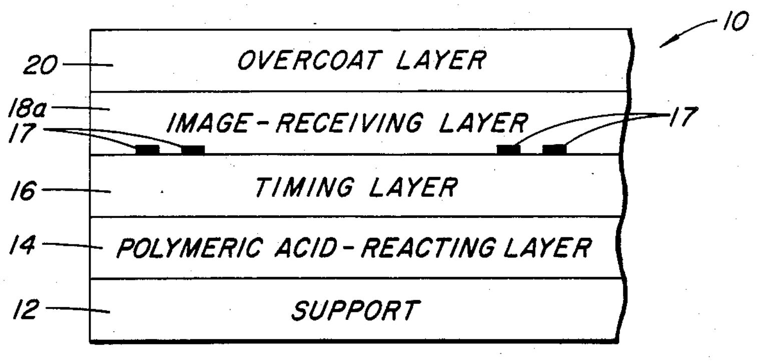
FIG. 1 is a diagrammatic cross-sectional view of an image-receiving element of the invention comprising a support layer, a polymeric acid layer, a polymeric timing layer, an image-receiving layer and an overcoat layer, and having a printed pattern on the timing layer.
Figure 2:
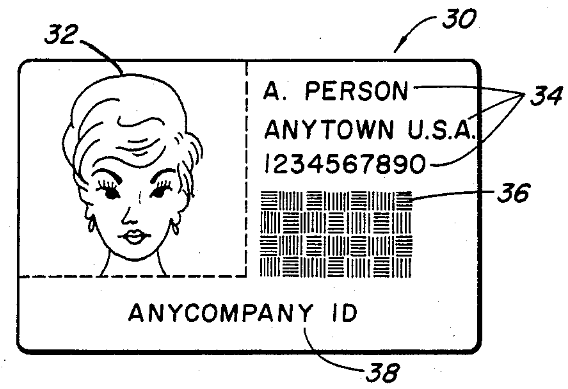
FIG. 2 is a plan view of a diffusion transfer print used in the production of a laminated information-print bearing document of the invention.

Referring to FIG. 1, there is shown a preferred image-receiving element 10 of the invention, suited to the production by photographic diffusion transfer processing of an ID photograph such as diffusion transfer print 30, shown in FIG. 2. Image-receiving element 10 comprises support layer 12 carrying a layer 14 of acid-reacting polymer, a timing layer 16 (on which is shown a printed security pattern 17), an image-receiving layer 18*a* (which upon photographic diffusion transfer processing becomes an image-bearing layer) and optional overcoat layer 20. Support layer 12 can comprise any of a variety of materials capable of carrying the various layers illustrated in FIG. 1. Thus, support layer 12 can comprise conventional rigid or flexible materials such as paper: polyolefin-coated papers, such as polyethylene and polypropylene-coated papers: polymethacrylic acid, methyl and ethyl esters: vinyl chloride polymers: polyvinyl acetal: polymeric resins such as polyethylene: polyamides such as nylon; polyesters such as polymeric films derived from ethylene glycol terephthalic acid; and cellulose derivatives such as cellulose acetate, triacetate, nitrate, propionate, butyrate, acetate-propionate, or acetate-butyrate. Depending upon the particular nature of the information-bearing document desirably produced from image-receiving element 10, the nature of support layer 12 as a transparent, opaque or translucent material will be a matter of choice.

Traditionally, a preferred support for image-receiving elements has been paper, more particularly baryta paper. This paper actually is a paper base coated with a layer or layers of baryta ($BaSO_4$) suspended in a small amount of a gelatine solution. Baryta paper typically comprises a 5.0 mil (0.13 mm) paper stock coated with two layers of $BaSO_4$ to a total thickness of 0.5 mil (0.01 mm).

In recent years, the use of polymeric sheet materials and in particular the use of polymeric resin-coated paper products as an image-receiving element support has become widespread. These polymeric materials offer economic incentives while achieving advantageous properties for photographic supports, such as improved whiteness, wet strength and reagent imperviousness. Resin-coated paper, in particular polyethylene coated paper, has become widely used. Polyethylene-coated paper, such as used in Polacolor 2 film commercially available from Polaroid Corporation typically comprises a 4.0 mil (0.10 mm) thick, high strength paper coated on each side with a white, $TiO_2$-pigmented layer of polyethylene having a thickness of 2.0 mil (0.05 mm). Such a support material is a preferred material for the production of image-receiving elements used in the production of laminated documents.

Image-receiving layer 18*a*, timing layer 16 and polymeric acid layer 14 serve important functions in the provision of a diffusion transfer photograph such as is illustrated in FIG. 2. Image-receiving layer 18*a* will generally comprise a dyeable or dye-receptive material which is permeable to the alkaline processing composition customarily used in photographic diffusion transfer processing. The dyeable image-receiving layer can comprise, for example, materials which heretofore have been found to be useful as image-receiving materials in diffusion transfer photographic processes. Examples of such materials include such dyeable or dye-receptive materials as p-trimethylammonium-p-toluene-sulfonate benzal of polyvinyl alcohol, N-methoxy-methyl polyhexamethylene adipamide, polyvinyl alcohol, cross-linked polyvinyl alcohol (i.e., polyvinyl alcohol which has been reacted with a cross-linking agent such as glyoxal or dimethylourea, mixtures of polyvinyl alcohol and poly-N-vinyl pyrrolidone, and copolymers of vinyl alcohol and poly-N-vinyl pyrrolidone. A particularly preferred material for layer 18*a* is an admixture of polyvinyl alcohol or gelatin and a dye mordant such as poly-4-vinylpyridine, as disclosed in U.S. Pat. No. 3,148,061 (issued Sept. 18, 1964 to H. C. Haas). Polyvinyl alcohol and poly-4-vinylpyridine, in a weight ratio of 3:1 to 1:3, is preferred. Other alkali permeable and dyeable polymeric materials can, however, be suitably employed and examples can be found in U.S. Pat. No. 3,770,439 (issued Nov. 6, 1973 to L. D. Taylor); U.S. Pat. No. 4,080,346 (issued Mar. 31, 1978 to S. F. Bedell); and U.S. Pat. No. 4,322,489 (issued Mar. 30, 1982 to E. H. Land et al.).

Polymeric acid-reacting layer 14 functions in known manner during the processing of a diffusion transfer photograph from image-receiving element 10. Thus, polymeric acid layer 14 is employed to lower in predetermined manner the environmental pH of the film unit following substantial dye transfer in order to increase image stability and/or adjust the pH from a first pH at which the image dyes are diffusible to a second and lower pH at which such image-dyes are not diffusible.

As disclosed in, for example, U.S. Pat. No. 3,362,819 (issued Jan. 9, 1968 to E. H. Land), the polymeric acid-reacting layer may comprise a non-diffusible acid-reacting reagent adapted to lower the pH from the first (high) pH of the processing composition in which the image dyes are diffusible to a second (lower) pH at which they are not. The acid-reacting reagents are preferably polymers which contain acid groups, e.g., carboxylic acid and sulfonic acid groups, which are capable of forming salts with alkali metals or with organic bases; or potentially acid-yielding groups such as anhydrides or lactones. Preferably, the acid polymer contains free carboxyl groups. As examples of useful neutralizing layers, in addition to those disclosed in the aforementioned U.S. Pat. No. 3,362,819, mention may be made of those disclosed in the following U.S. Pat. Nos.: Bedell, 3,765,885; Sahatjian, et al., 3,819,371; Haas, 3,833,367; Taylor, 3,754,910 and Schlein, 3,756,815.

In the image-receiving element of FIG. 1 is shown a timing layer 16 which is included for the control of the pH-reducing properties of the polymeric acid-reacting layer. Timing (or spacer) layer 16 will be comprised of polyvinyl alcohol, gelatin or other polymer through which the alkali may diffuse to the polymeric acid-reacting layer. The presence of such a timing layer between the image-receiving layer 18*a* and the acid-reacting layer 14 effectively controls the initiation and the rate of capture of alkali by the acid-reacting layer. Suitable materials for the formation of timing layers and the advantages thereof in diffusion transfer systems are described with particularity in U.S. Pat. Nos. 3,362,819; 3,419,389; 3,421,893; 3,455,686; 3,577,237 and 3,575,701.

Shown in the article of FIG. 1 is overcoat 20 which comprises an optional layer of image-receiving element 10. In some instances, it may be desirable to provide layer 20 as a means of facilitating separation of image-receiving element 10 from a photosensitive element. Thus, where the image-receiving element is used in a photographic film unit which is processed by distribution of an aqueous alkaline processing composition between the image-receiving element and a photoexposed photosensitive element and is adapted, after formation of a dye image, to separation from the developed photosensitive element and the processing composition, overcoat layer 20 can effectively function as a "strip coat". The diffusion transfer photograph produced from image-receiving element 10 may, thus, additionally include on its surface a residue of the overcoat stripping layer used to facilitate the peeling apart of the elements. The stripping layer can be formed by coating the image-receiving layer 18*a* with a solution of ammonia and a hydrophilic colloid (usually gum arabic), as described in the aforementioned U.S. Pat. No. 4,322,489 and in U.S. Pat. No. 4,009,031 (issued Feb. 22, 1977 to D. P. Carlson).

Shown on timing layer 16 is printed pattern 17 which contributes importantly to information-bearing documents prepared from image-receiving element 10 of FIG. 1. Pattern 17 may be incorporated into element 10 in the form of a pattern of characters or signs or a floral or other fanciful or decorative design. An official design or logo, or a name or phrase associated, for example, with the issuing authority may be used. An added degree of security can be accomplished by applying pattern 17 in an ordered arrangement having a tightly-printed pattern, i.e., having a plurality of finely-divided printed and unprinted areas in close proximity to one another. A tightly-printed pattern may, for example, appear as an often-repeated logo or design. A preferred pattern 17 is a fine-line printed security pattern such is used in the printing of banknote paper, stock certificates and like and may take the form of filigree, guilloche or other fine-line printing. In FIG. 2 is shown a diffusion transfer photograph prepared from an image-receiving element having a preprinted security pattern. As seen in the photograph of FIG. 2, a security pattern 36 is illustrated as appearing over a portion of the area encompassing the photograph. The pattern may, however, be applied to occupy a proportionally greater part of the area. While there is shown in FIG. 2 for purposes of illustration a pattern 36 of relative simplicity, it will be appreciated that it will be advantageous from the standpoint of enhanced security of the document to employ an intricate pattern which cannot be readily duplicated and which is of the character used in security printing.

Pattern 17 can be applied to timing layer 16 of image-receiving element 10 in a number of ways. Thus, the pattern can be formed by applying, printing or drawing a paint or ink composition having a binding agent and patterning agent (e.g., ink) as main components, onto timing layer 16. This can be accomplished by resort to a painting process such as brush painting, spatula painting, roll-coating or by a gravure-coating process or by a printing process such as gravure printing, offset printing, flexographic printing, screen printing, relief printing or transfer printing. It will be appreciated that the particular means employed for applying pattern 17 will depend upon the nature of the pattern desirably employed (particularly the intricacy thereof) and on the binding and/or patterning agents employed and the nature of the contiguous layers between which the pattern is to be applied.

Figure 5:
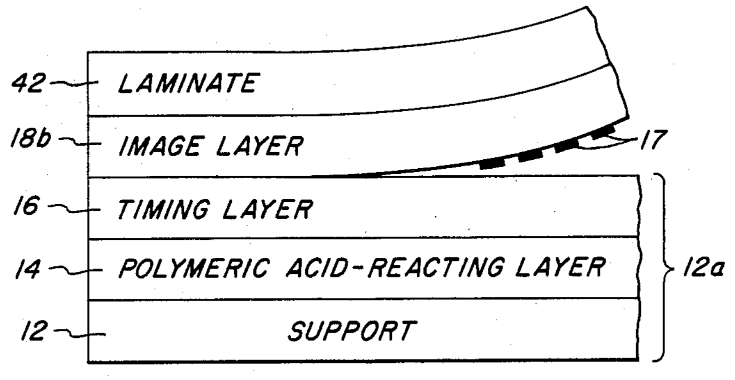
FIG. 5 is a diagrammatic cross-sectional view of a diffusion transfer print partially delaminated, with the printed security pattern preferentially adhered to the image-bearing layer.

It is important in integrating the printed security pattern into the image-receiving element (and the diffusion transfer photograph prepared therefrom) that it be incorporated in such a manner that the inherent security of the printed pattern is not readily compromised. The security of the laminated document will be influenced in particular by the nature of the adhesion between the respective layers between which the printed pattern is applied and by the nature of the delamination of such layers, in the event such a delamination is effected. In FIG. 5 is shown a laminated information-bearing document of the invention in a partially delaminated condition. On image-bearing layer **18*b* is a protective sheet 42 of plastic material applied by a known lamination method. In the case of the delamination illustrated in FIG. 5 (resulting from an attempt to remove the protective sheet from the photograph), the printed pattern is shown as being bonded to image-bearing layer 18*b*. This effectively negates the usefulness of element 12*a* insofar as re-use of the element in the production of a laminated information-bearing document is concerned. The preferred delamination mode illustrated in FIG. 5 is accomplished by utilization of a binder material for pattern material 17, preferentially adhesive to image-receiving layer 18*a* (and image-bearing layer 18*b***). The manner in which this is accomplished is described in greater detail hereinafter.

Figure 6:
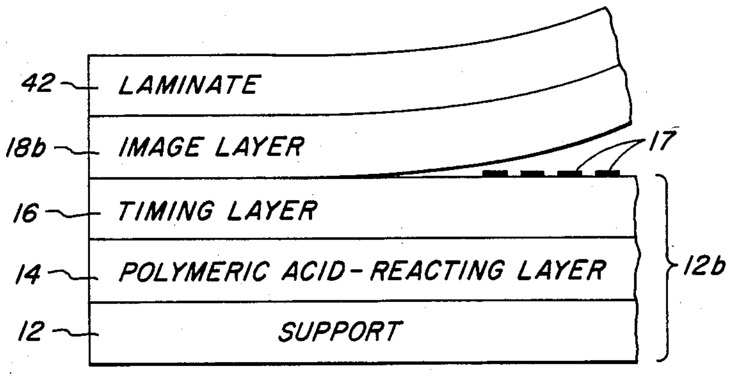
FIG. 6 is a diagrammatic cross-sectional view of a diffusion transfer print partially delaminated, with the printed security pattern preferentially adhered to the polymeric timing layer.

In FIG. 6 is shown a delamination where printed pattern 17 remains with timing layer 16 as part of element **12*b*. It will be seen that element 12*b*, in the event of a delamination in the manner illustrated, could be re-used. A transparency image could be superposed upon element 12*b* and be provided with a protective laminated overlay to provide a seemingly validly issued document. The delamination illustrated in FIG. 6**, thus, constitutes an unacceptable delamination.

The binder used for applying the printed pattern 17 should be comprised of a material which permits the contiguous layers between which the pattern is applied to be securely bound such that a delamination at the interface of such layers cannot readily be accomplished. In addition, the binder should be comprised of a material exhibiting preferential adhesion to the layer (of the contiguous layers between which the pattern is incorporated) closest in proximity to the image-receiving layer. Thus, in the undesired event of a delamination at the interface of the contiguous layers, the property of preferential adhesion will afford protection against reuse of the delaminated components. Desired preferential adhesion can be most readily accomplished by using as the binder for the patterning agent a material having the same or a similar chemical composition as the material to which the pattern would be preferentially adhered. In the case of the printing of pattern 17 onto timing layer 16, use of a binder having the chemical constitution of the material used for the formation of image-receiving layer **18*a* (or of a major component thereof) or of an organic binder material exhibiting adhesion to image-receiving layer 18*a* (or 18*b*), in preference to timing layer 16, will be employed. A preferred image-receiving material for layer 18*a* is a mixture of polyvinyl alcohol and polyvinyl pyridine. Such a mixture can be employed as a binder for the patterning agent used in applying printed pattern 17**.

In FIG. 1, printed pattern 17 is shown on timing layer 17. The pattern can, however, be applied between support layer 12 and polymeric acid layer 14 (in which case the binder for the patterning agent will be preferentially adherent to polymeric acid layer 14); or between polymeric acid layer 14 and timing layer 16 (in which case the binder will be preferentially adherent to timing layer 16). The chemical nature of the binder material will, thus, depend in part upon the location of the printed pattern in the image-receiving element and the chemical nature of the layer to which the pattern is to be preferentially adherent. The nature of the binder material utilized will also depend upon the particular patterning agent employed, the relative proportions of binder and patterning agent and upon the desired printed pattern, particularly the coverage and thickness thereof.

The binding agent used for the provision of a paint or ink of patterning agent can comprise a variety of homopolymers of copolymers of such monomers as vinyl halide, such as vinyl chloride or vinylidene chloride;styrene or its derivatives; vinyl esters, such as vinyl acetate; unsaturated carboxylic acids such as acrylic acid or methacrylic acid, or maleic acid; ester derivatives, nitrile derivatives or acid amide derivatives of the abovementioned unsaturated carboxylic acids; glycidyl acrylate; glycidyl methacrylate; 2-hydroxyethyl acrylate or methacrylate; ethylene glycol di-acrylate or -methacrylate; methyl vinyl ketone; vinyl pyridine; and vinyl pyrrolidone. Also useful are polyvinyl alcohol, polyvinyl butyral, polyamide resins, polyesters, polyurethanes epoxy resins, hydroxypropyl cellulose and carboxymethyl cellulose.

The patterning agent can vary depending upon the nature of the desired pattern and can comprise any of a variety of coloring agents used in the printing arts. The patterning agent should, however, be compatible with the binder employed therewith and should be dispersible therein so that the resulting paint or ink composition can be applied by one of the methods previously described. If desired, the patterning agent can be comprised of material which provides a visible colored pattern or design or one which forms an invisible pattern, such as a fluorescent pigment that becomes visible when examined under a source of ultraviolet light. There can be used as the patterning agent, known coloring agents including inorganic pigments or organic dyes or pigments. Suitable patterning agents include such inorganic pigments as calcium carbonate, barium sulfate, titanium dioxide, carbon black, yellow lead, bismuth oxychloride, chromium vermilion, cadmium red, navy blue, ultramarine or iron oxide or such organic dyes or pigments as dyes or pigments of the azo class, vat series dyes or pigments, phthalocyanine series dyes or pigments, such as copper phthalocyanine, triphenyl methane series dyes, quinacrydone series pigments, perylene dyes and the like.

The thickness of the pattern incorporated into the image-receiving element can vary. Typically, the thickness will be the range of from 0.02 to 0.5 mil (0.00051 to 0.013 mm.). Coverage can vary and a tightly printed pattern will be preferred from the standpoint of security, i.e., difficulty in reproducing an intricate pattern. Depending upon the nature of the binding agent and the nature of the contiguous layers between which the printing is positioned, higher coverages and thicknesses may tend to lessen the adhesion between such contiguous layers. Accordingly, the selected pattern and coverage and thickness thereof should be employed in a manner to maximize adhesion and to provide the preferential adhesion described hereinbefore.

The image-receiving element of FIG. 1 can be used for the provision of a diffusion transfer photograph such as ID photograph 30, shown in FIG. 2. Such a diffusion transfer photograph is typically prepared by simultaneously photographing the bearer and certain personal information relating to the bearer. Thus, the intended bearer of an ID card will report to an ID card issuance station where appropriate photographic materials and equipment are assembled. A data card containing information relating to the bearer is prepared and the bearer and the data card are photographed simultaneously with a camera unit employing diffusion transfer photographic film (comprising a photosensitive element, an image-receiving element such as shown in FIG. 1 and a rupturable pod containing photographic processing composition for distributuion after photoexposure between such elements). As shown in FIG. 2, ID photograph 30 includes personal data 34 and the likeness 32 of the bearer, resulting from the simultaneous photoexposure. Printed security pattern 36 corresponding to the pattern 17 of image-receiving element 10 is shown in ID photograph 30. Preferably, pattern 36 will appear in close proximity to personal indicia 34 such that an attempt at alteration of such indicia would likely cause an obliteration of pattern 36 or otherwise show evidence of tampering. Data 38 can be part of the photographed data card or part a preprinted support, corresponding to support 12 of FIG. 1.

An ID photograph 30 can be obtained from an image-receiving element of the invention by known photographic processing. Essentially, a film unit including such element will also include a photosensitive element that can provide an imagewise distribution of diffusion image-dye providing materials (after exposure and after application of a processing composition between the photoexposed element an the superposed image-receiving element of the invention). Once development is complete, the photosensitive element and image-receiving are peeled away and the photographic image is viewed in the image-receiving layer of the photograph 30.

Figure 3:
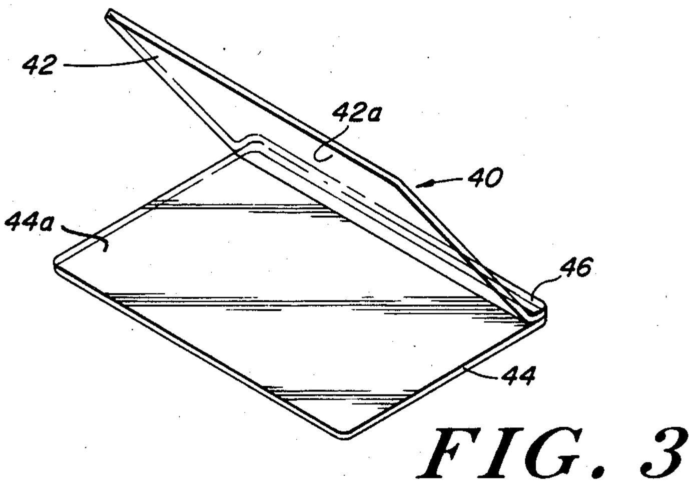
FIG. 3 is a perspective view of a protective plastic pouch or envelope for receiving an information-bearing diffusion transfer print in producing a laminated information-bearing document of the invention.

As mentioned previously, in forming an ID card it is common practice to seal the identification document between two sheets of protective material. A favored structure for fully protecting the front and rear surfaces of an ID photograph comprises an envelope-type pouch such as is shown in FIG. 3. In pouch 40, is shown front plastic sheet member 42 which is coupled to rear plastic sheet member 44 along edge 46, usually by an adhesive bond. Pouch 40 will typically have dimensions slightly greater than those of the ID photograph, so that the peripheral edges of the front and rear protective members can be sealed together during a heat and/or pressure lamination. Preferred materials for use as protective sheet members 42 and 44 include rigid or semirigid vinyl, e.g., the polyvinyl chloride or polyvinyl chloride/polyvinyl acetate copolymers known in the art. Polyester and other sheet materials can also be employed.

Inner surface 42*a* of sheet member 42 (and inner surface 44*a* of sheet member 44) will be comprised of adhesive material (not shown) to effect proper adhesion of these members to the ID photograph. The adhesive materials on these members can be the same or different. A preferred pouch structure includes heat-activatable adhesive (such as ethylene/ethyl acrylate copolymer) on the inner surface of sheet members 42 and 44, and additionally over such adhesive material on front member 42, a layer of a mixture of polyvinyl alcohol and poly-4-vinyl pyridine. This mixture provides an excellent security seal between the moist surface of a diffusion transfer photograph and the sheet member 42 upon lamination.

Figure 4:
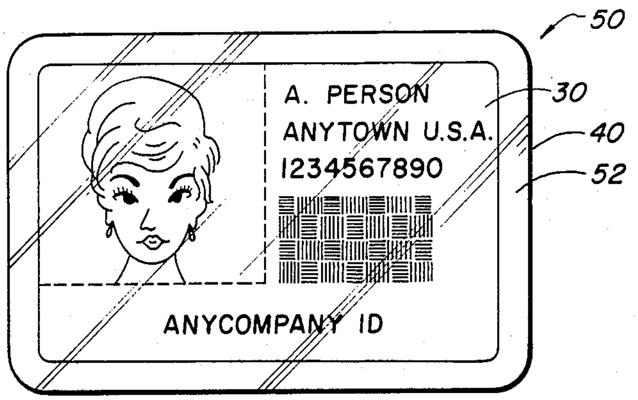
FIG. 4 is a plan view of an assembled ID card.

Following positioning of ID photograph 30 of FIG. 2 between the protective sheet elements of pouch 40 (FIG. 3), the structure can be laminated, as by heat sealing to provide a finished ID card 50, shown in FIG. 4. As shown in FIG. 4, photograph 30 is entered in pouch 40 which defines a border 52 around the photograph.

The following examples are provided to further illustrate the invention. It will be understood that the examples are intended to be illustrative and not limiting in nature. All parts and percentages are by weight unless otherwise specified.

EXAMPLE 1

This Example illustrates the production of a blue printing ink composition and the use thereof in the production of a preprinted image-receiving element and a laminated information-bearing document.

Into 100 parts of a binder composition (prepared by combining 40.7 kg. of polyvinyl alcohol; 40.7 kg. of poly-4-vinylpyridine; 19.3 kg. of lactic acid; 0.518 kg. of Emulphor ON 870 polyethoxylated fatty alcohol emulsifer; and 964 liters of water) were added, slowly and with stirring, 50 parts of a blue copper phthalocyanine pigment dispersion (commercially available from Nuodex, Inc. Piscataway, N.J. as Thalo Blue "E" #868-7214 and comprising copper phthalocyanine pigment dispersed in water with the aid of dispersing and wetting agents). The mixture was stirred until thoroughly mixed, to provide a blue printing ink composition.

An image-receiving element including a printed security pattern was prepared by coating a polymeric support in the following manner. The polymeric support was a polyethylene-clad paper comprising a 4.0 mil (0.10 mm.) thick, high strength paper coated on each side with a white, $TiO_2$-pigment layer of poyethylene having a thickness of 2.0 mil (0.05 mm.). The support was provided with the following layers:

1. a mixture of about eight parts of a partial butyl ester of polyethylene/maleic anhydride and about one part of polyvinyl butyral resin (Butvar, Shawinigan Products, New York, N.Y.) to from an acid-reacting polymeric layer approximately 0.6 to 0.9 mils (0.01–0.02 mm.) thick; and 2. a mixture of about seven parts of hydroxy-propyl cellulose (Klucel J12HB, Hercules, Inc., Wilmington, Del.) and about four parts polyvinyl alcohol, to form a timing layer approximately 0.30 to 0.37 mils (0.008–0.009 mm.) thick.

Onto the timing layer, a security pattern was printed using the blue ink composition as aforedescribed. The pattern was applied over the entire surface of the timing layer, using a gravure cylinder with a 200-line screen. The pattern was in the style of security printing customarily used in banknote printing. The ink pattern was dried by passing through an oven to provide a dry print pattern having a thickness of about 0.35 mil (0.009 mm.).

Onto the timing layer carrying the blue printed security pattern, there was applied:

3. a mixture of about two parts of polyvinyl alcohol and one part of poly-4-vinylpyridine, to form an image-receiving layer approximately 0.35 to 0.45 mils (0.009–0.011 mm.) thick, also containing an equimolar mixture of the cis- and trans- isomers of 4,5-cyclopentahexahydro-pyrimidine-2-thione (described in U.S. Pat. No. 3,785,813, issued Jan. 15, 1974 to D. O. Rickter) as a development restraining reagent, and hardened by a condensate of acrolein and formaldehyde; and 4. a stripping overcoat layer formed by coating a gum arabic/ammonia solution (about two parts ammonium hydroxide) at a total solids coverage of about 16 mgs./ft.$^2$ (172 mgs./m.$^2$).

The image-receiving element prepared as aforedescribed was used in the following manner to prepare a diffusion transfer photograph. The image-receiving element was combined with a photosensitive element (commercially available in Polacolor 2, T-108 film, from Polaroid Corporation, Cambridge, MA) to form a film unit. The image-receiving and photosensitive elements of the film unit were in face-to-face relation; and a rupturable container (containing aqueous alkaline processing composition) was affixed to the leading edge of the elements, such that, upon application of compressive pressure to the container, the contents thereof would be distributed, upon rupture of the marginal seal of the container, between the surface layer of the photosensitive and image-receiving elements. The photosensitive element was photoexposed and the film unit was passed between pressure rollers to rupture the rupturable container and to spread the processing composition between the photosensitive and image-receiving elements, as aforesaid. Following the prescribed imbibition period, the image-receiving element (the diffusion transfer photograph) was separated from the remainder of its film unit. The photograph was a multicolor photograph showing a recordation of the photographed subject matter against a background of a blue security pattern.

ID cards were prepared using photographs prepared as aforedescribed. Polyester pouches having on the inner surface of each of the front and rear polyester members a heat-activatable ethylene/ethyl acrylate copolymer adhesive (and, in addition, on the front member, a layer of polyvinyl alcohol and poly-4-vinylpyridine over the ethylene/ethyl acrylate) were used to provide ID cards by heat lamination. ID cards were prepared by: positioning a still-wet photograph into a polyester pouch such that the image-receiving layer of the photograph would be in contact with the poyvinyl alcohol/poly-4-vinylpyridine adhesive layer of the front pouch member upon lamination; and heat laminating to provide the ID card. Other ID cards were prepared in the same manner, except that, the photographs were allowed to dry prior to insertion into the pouch and lamination. In either case, upon attempts to remove the photographs from their pouches to effect alterations of the photographs, resulting delaminations that occured showed the printed pattern to be preferentially adhered to the image-bearing layer of the photograph, according to the delamination mode illustrated in FIG. 5.

EXAMPLE 2

A tan-colored printing compostion was prepared by slowly mixing together 33.18 parts of Yellow Oxide (#888-1810C, Nuodex, Inc., yellow iron oxide pigment) and 13.80 parts of Red Oxide (#888-1045F, Nuodex, Inc., red iron oxide pigment); and adding the resulting tan-colored composition with stirring to 100 parts of a binder composition having the composition described in Example 1. In the manner described in Example 1, the tan printing composition was used in place of the blue ink to provide image-receiving elements, diffusion transfer photographs and ID cards. Delaminations effected in the manner described in Example 1 occured according to the mode illustrated in FIG. 5.

EXAMPLE 3

A yellow printing-ink composition was prepared by adding with stirring 50 parts of a yellow pigment (Yellow AXX #888-2551, Nuodex, Inc., mixture of Pigment Yellow 74 and Pigment Yellow 3, referenced in Color Index) to 100 parts of a binder oomposition (consituted as described in Example 1). To the resulting ink composition, 2.5 parts of n-butyl alcohol were added to prevent foaming of the oomposition during mixing and printing operations. Security printed image-receiving elements were prepared, using the resulting ink composition in the manner described in Example 1, except that the yellow ink security printing was applied by a flexographic method which provided fine filigree lines of approximately four mil (0.10 mm.) width.

EXAMPLE 4

A red printing ink composition was prepared in the manner described in Example 3, using in place thereof, the following ingredients in the stated parts by weight:

| Ingredients | Parts by Weight |
|---|---|
| Binder Composition (as described in Example 1) | 100.0 |
| Fast Red H #888-0787 (Nuodex, Inc., perylene red) | 40.0 |
| n-Butyl Alcohol | 2.5 |

Security-printed image-receiving elements were prepared, using the resulting red printing ink composition in the manner described in Example 1, except that the printed pattern was applied by a flexographic printing method. A good security pattern was applied.

EXAMPLE 5

A black printing ink composition was prepared in the manner described in Example 3, using in place thereof, the following ingredients in the stated parts by weight:

| Ingredients | Parts by Weight |
|---|---|
| Binder Composition (as described in Example 1) | 100.0 |
| Lampblack #888-9907B (Nuodex, Inc., carbon black) | 15.0 |
| n-Butyl Alcohol | 2.5 |

Good results were obtained in the manufacture of security-printed image-receiving elements, using the resulting black ink composition described in Example 1, except that the security printing was applied by a flexographic method.

EXAMPLE 6

A blue printing ink composition was prepared from copper phthalocyanine (synthesized by reaction of copper with phthalonitrile) in the following manner. The copper phthalocyanine reaction product was filtered and washed with water to provide a finely divided copper phthalocyanine pigment in the form of a filter cake containing approximately 50% by weight of water. The filter cake was added gradually and directly (with stirring) into a binder composition (having the composition described in Example 1, except that a small amount of condensate of acrolein and formaldehyde as a hardening agent was additionally present). The ratio of copper phthalocyanine pigment to the binder composition was 1:2 by weight. The composition was (by addition of water) brought to a Zahn Cup viscosity of 30 seconds and was used in the manner described in Example 1, for the production of image-receiving elements, except that the printed pattern was applied by a flexographic printing method.

Since certain changes may be made in the aforedescribed embodiments of the present invention without departing from the scope of the invention herein involved, it is intended that all matter contained in the above description shall be interpreted as illustrative and not in a limiting sense.

What is claimed is:

1. An image-receiving element adapted to the production of a diffusion transfer photograph, said image-receiving element comprising a support layer carrying, in sequence, a polymeric acid-reacting layer, a polymeric timing layer through which alkali may pass to said polymeric acid-reacting layer, and an alkali permeable and dyeable image-receiving layer, said image-receiving element including between contiguous layers thereof, a printed security pattern comprising a pattern agent and a binder therefor, said binder being preferentially adhesive to the layer of said contiguous layers closest in proximity to said image-receiving layer, if such contiguous layers are deliminated.

2. The image-receiving element of claim 1 wherein said printed security pattern comprises a tightly-printed pattern.

3. The image-receiving element of claim 2 wherein said printed security pattern is a fine-line filigree or guilloche pattern.

4. The image-receiving element of claim 3 wherein said fine-line filligree or guilloche pattern is present in a thickness of from 0.00051 to 0.013 mm.

5. The image-receiving element of claim 1 wherein said printed security pattern is present on said timing layer and between said timing layer and said alkali permeable and dyeable image-receiving layer.

6. The image-receiving element of claim 5 wherein said alkali permeable and dyeable layer comprises a mixture of polyvinyl alcohol and poly-4-vinylpyridine.

7. the image-receiving element of claim 6 wherein said polyvinyl alcohol and said poly-4-vinylpyridine are present in a weight ratio of from 3:1 to 1:3.

8. The image-receiving element of claim 5 wherein the binder for said printed security pattern has substantially the chemical composition of said alkali permeable and dyeable image-receiving layer.

9. The image-receiving element of claim 6 wherein said binder comprises a mixture of polyvinyl alcohol and poly-4-vinylpyridine.

10. The image-receiving element of claim 9 wherein said timing layer comprises a mixture of hydroxypropyl cellulose and polyvinyl alcohol.

11. The image-receiving element of claim 1 wherein said support layer comprises a polyethylene-coated paper support.

12. The image-receiving element of claim 1 wherein said patterning agent comprises a colored pigment or dye.

13. A laminated information-bearing document comprising an information-bearing diffusion transfer photograph and a protective plastic sheet material bonded to at least a surface thereof, said information-bearing diffusion transfer photograph comprising a support layer carrying, in sequence, a polymeric acid-reacting layer, a polymeric timing layer through which alkali may pass to said polymeric acid-reacting layer, and an image-bearing layer, said information-bearing diffusion transfer photograph including between contiguous layers thereof, a printed security pattern comprising a patterning agent and a binder therefor, said binder being preferentially adhesive to the layer of such contiguous layers closest in proximity to said image-bearing layer, if such contiguous layers are deliminated.

14. The laminated information-bearing document of claim 3 wherein said printed security pattern comprises a fine-line pattern.

15. The laminated information-bearing document of claim 14 wherein said fine-line pattern is present on said timing layer and between said timing layer and said image-bearing layer.

16. The laminated information-bearing document of claim 14 wherein said image-bearing layer includes a photographic image of the likeness of the bearer of said information-bearing document and personal information relating to such bearer.

17. The information-bearing document of claim 16 wherein said image-bearing layer comprises a mixture of polyvinyl alcohol and poly-4-vinylpyridine.

18. The information-bearing document of claim 17 wherein said polyvinyl alcohol and poly-4-vinylpyridine are present in said image-bearing layer in a ratio of about 2:1.

19. The information-bearing document of claim 17 wherein said binder comprises a mixture of polyvinyl alcohol and poly-4-vinylpyridine in a ratio of about 1:1.

20. The information-bearing document of claim 15 wherein said fine-line pattern comprises a colored pigment or dye in a binder preferentially adhesive to said image-bearing layer.

21. The information-bearing document of claim 20 wherein said image-bearing layer comprises a mixture of polyvinyl alcohol and poly-4 -vinylpyridine.

22. The information-bearing document of claim 21 wherein said binder comprises a mixture of polyvinyl alcohol and poly-4-vinylpyridine.

23. The information-bearing document of claim 22 wherein said support layer comprises polyethylene-coated paper.

24. The information-bearing document of claim 23 wherein the front and rear surfaces of said diffusion transfer photograph are protected by adhesively bonded front and rear plastic sheet members.

25. The laminated information-bearing document of claim 15 wherein the binder for said fine-line pattern has substantially the chemical composition of the image-receiving material from which said image-bearing layer is obtained.

* * * * *